United States Patent [19]

Yokoshima et al.

[11] 4,305,096
[45] Dec. 8, 1981

[54] METHOD OF DETECTING WELD LINES

[75] Inventors: Naohiko Yokoshima; Toshisuke Isoya; Masayuki Mishiro, all of Hirakata, Japan

[73] Assignee: Kabushiki Kaisha Komatsu Seisakusho, Tokyo, Japan

[21] Appl. No.: 124,818

[22] Filed: Feb. 26, 1980

[51] Int. Cl.³ .............................................. H04N 7/18
[52] U.S. Cl. ................................... 358/101; 358/106; 358/107; 219/121 EV
[58] Field of Search ..................... 358/101, 106, 107; 364/515; 219/121 EV, 121 EW

[56] References Cited

U.S. PATENT DOCUMENTS

| | | | |
|---|---|---|---|
| 4,021,840 | 5/1977 | Ellsworth | 358/101 |
| 4,093,844 | 6/1978 | Fellure | 358/101 |
| 4,168,430 | 9/1979 | Denis | 358/101 |

Primary Examiner—Howard Britton
Attorney, Agent, or Firm—Spensley, Horn, Jubas & Lubitz

[57] ABSTRACT

In a method of detecting a weld line, the positions of the weld line and the welding wire are detected from the video signal of the weld, which is provided by an industrial television camera. The video signal of the weld is compared with a predetermined threshold so as to be binary-coded into a signal representing a dark part and a signal representing a bright part. Clock signals having a predetermined frequency are counted with the binary-coded signals as gating signals, thereby to count the lengths of the dark part and the bright parts. The count values are subjected to difference processing, so that the positions of the weld line and the welding wire are detected from the maximum values of the results of the difference processing.

12 Claims, 10 Drawing Figures

METHOD OF DETECTING WELD LINES

BACKGROUND OF THE INVENTION

This invention relates to a method of detecting a weld line in which an industrial television camera advancing ahead of a welding wire along the weld line provides the video signal of the weld, the video signal thus provided is compared with a threshold value so as to be binary coded into a signal representative of the dark part of the weld and a signal representative of the bright part of the weld, the data of the dark and bright parts are subjected to difference processing to provide maximum values thereof, and the positions of the weld line and the welding wires are simultaneously or separately detected.

In order to set a welding wire accurately on the weld line, it is essential to detect the position of the weld before welding is carried out. If the detection is insufficient, then the quality of the weld may be poor. Therefore, a variety of methods have been employed to accurately detect the position of a weld line. Among the conventional methods, methods of optically detecting weld lines are extensively employed in the art. Furthermore, among these optically detecting methods, a method in which arcs at a weld are detected by light receiving elements to provide electrical signals, and the weld line is detected from the magnitudes of the electrical signals, is high in accuracy.

However, the method is still disadvantageous in resolution.

SUMMARY OF THE INVENTION

In view of the foregoing, an object of this invention is to provide a method of detecting a weld line, which is considerably superior in resolution to the aforementioned conventional optically detecting method utilizing light receiving elements, and is simple in processing after the detection.

In the method of the invention, an industrial television camera which is provided in such a manner as to advance ahead of a welding wire along a weld line to view the weld from obliquely above produces a video signal of the weld, the video signal thus produced is compared with a predetermined threshold value so as to be binary-coded into data representing the bright part and the dark part of the weld, the data are subjected to difference processing to obtain the maximum values thereof, the positions of the weld line and the welding wire are simultaneously or independently detected from the maximum values, so that the welding torch is moved along the weld line.

Therefore, the method of the invention is much more excellent in resolution than the conventional method which detects the position by using the light receiving elements. Furthermore, in the method of the invention, the positions of the weld line and the welding wire can be detected merely by subjecting the binary-coded signals to difference processing. Therefore, the processing required after the detection of the positions of the weld line and the welding wire is considerably simple, which makes it possible to simplify the detector.

The nature, principle and utility of the invention will become more apparent from the following detailed description and the appended claims when read in conjunction with the accompanying drawings.

Figure 4:
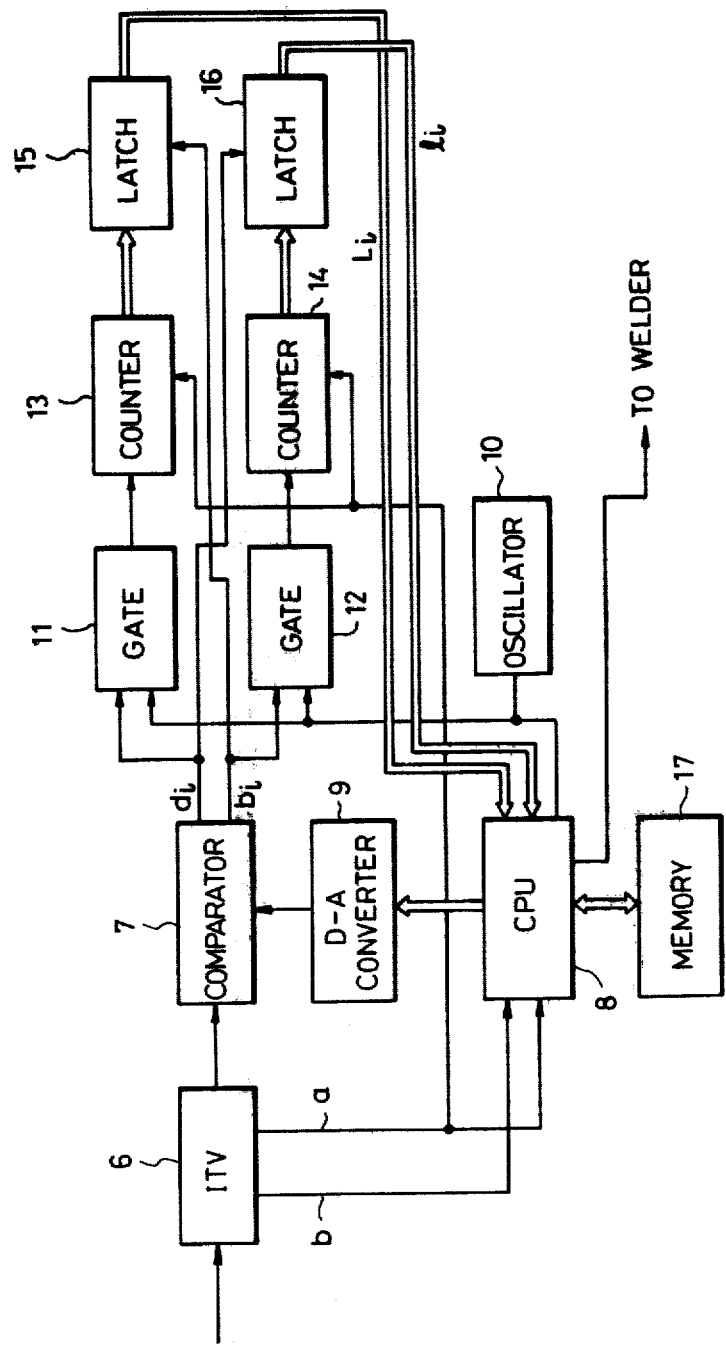
FIG. 4 is a block diagram showing an electrical circuit for processing a video signal of the weld which is outputted by the industrial television camera.
Figure 7:
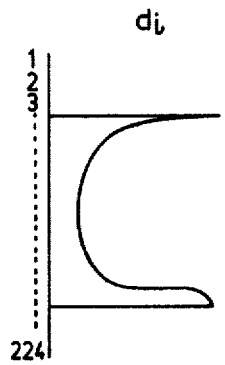
Figure 7:
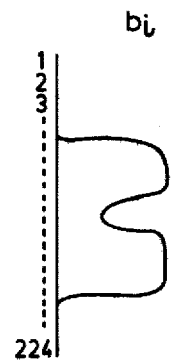
Figure 8:
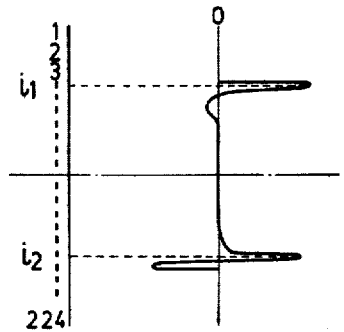
Figure 8:
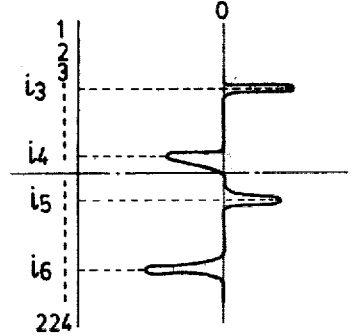

The parts (a) and (b) of FIG. 7 are waveform diagrams showing a dark part signal and a bright part signal applied to a central processing unit in FIG. 4; and The parts (a) and (b) of FIG. 8 are also waveform diagram showing the dark part signal and the bright part signal subjected to difference processing.

DETAILED DESCRIPTION OF THE INVENTION

Figure 1:
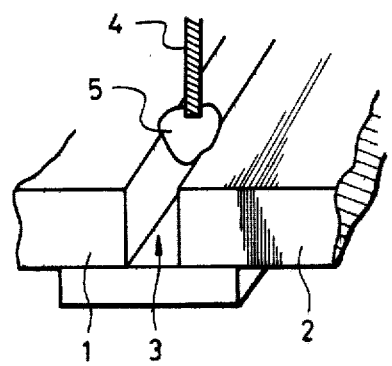
FIG. 1 is a perspective view showing base metals to be welded with a welding wire.
Figure 2:
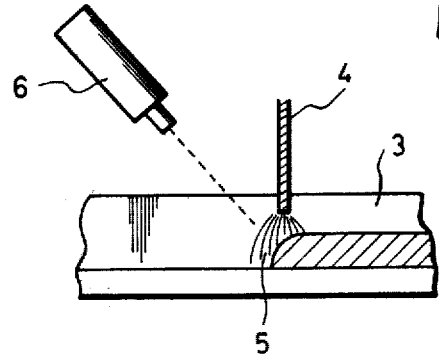
FIG. 2 is an explanatory diagram showing the relative position of an industrial television camera shooting a weld.
Figure 3:
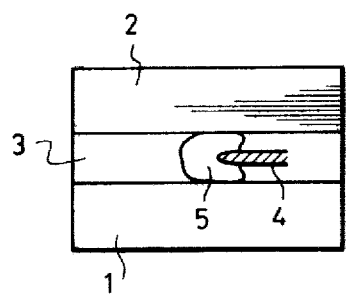
FIG. 3 is an explanatory diagram showing a picture of the weld taken by the industrial television camera.

Referring to FIGS. 1 through 3, reference numerals 1 and 2 designate base metals to be welded, which are disposed on both sides of a weld line (beveling) 3. A welding wire 4 is positioned above the weld line 3, the welding wire 4 being fed and guided by an automatic welding (not shown). The welding is carried out by generating an arc 5 between the welding wire 4 and the base metals 1 and 2. An industrial television camera 6 (hereinafter referred to as "an ITV 6" when applicable) is provided to view the weld in such a manner that it moves with the welding wire 4 with a predetermined distance therebetween in the direction of movement of the welding wire at all times. The image of the weld, which is provided by the ITV 6, is such that, as shown in FIG. 3, the arc 5 is produced between the base metals 1 and 2, having a recessed dark portion formed in correspondence to the welding wire.

Figure 5:
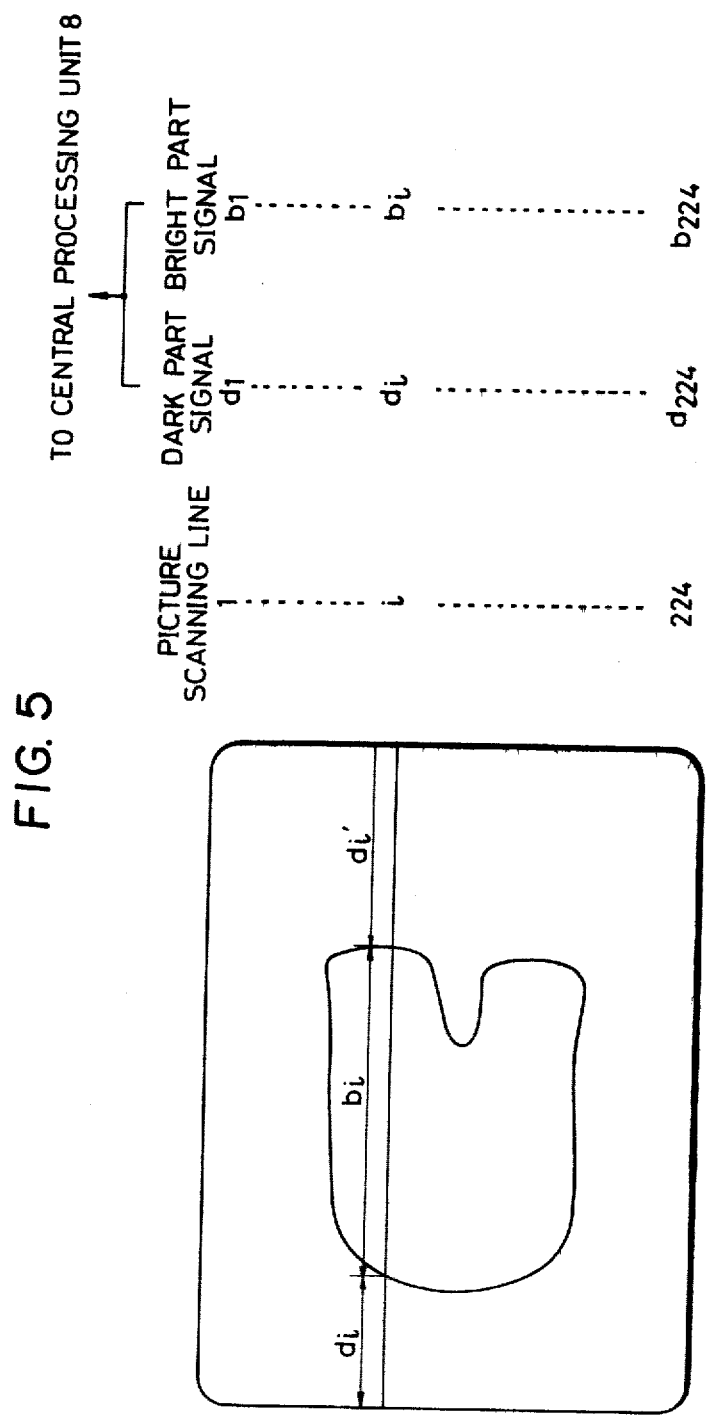
FIG. 5 is an explanatory diagram indicating variations of the video signal with respect to scanning positions.
Figure 6:
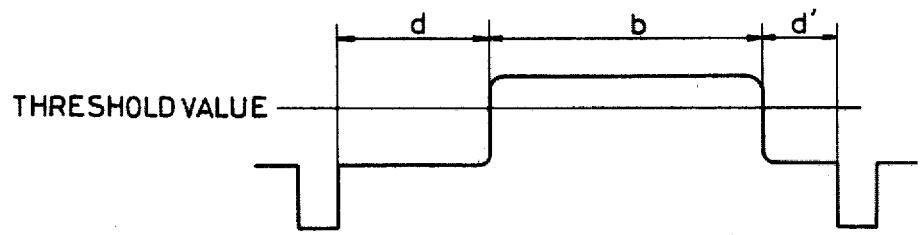
FIG. 6 is an explanatory diagram for a description of the binary-coding operation of the video signal with the aid of a threshold value.

It is assumed that the number of picture scanning lines of the ITV 6 is 224. When the ITV 6 takes a picture of the weld, then the video signal of the arc region 5 is as shown in FIG. 5. When the ITV 6 carries out, for instance, the i-th scanning, the video signal provided by the ITV is as shown in FIG. 6. The video signal is applied to a comparator 7 (FIG. 4). A signal representative of a threshold value provided by a central processing unit 8 is applied through a digital-to-analog converter 9 to the comparator 7. The video signal is compared with the threshold value in the comparator 7, so that it is binary-coded into a dark part signal $d_i$ and a bright part signal $b_i$. The dark part signal $d_i$ is a signal which is raised to a logical level "1" (hereinafter referred to merely as "1" when applicable) when the ITV scans a region d or d' in FIG. 6, and the bright part signal $b_i$ is a signal which is raised to "1" when the ITV scans a region b in FIG. 6. The dark part signal $d_i$ and the bright part signal $b_i$ are applied to gate circuits 11 and 12, respectively. A clock pulse signal having a predetermined frequency generated by an oscillator 10 is applied to both of the gate circuits 11 and 12. The clock pulse signal, being gated with the aid of the dark part signal $d_i$ and the bright part signal $b_i$, is applied through the gate circuits 11 and 12 to counters 13 and 14, respectively. A horizontal synchronizing signal a is applied to the reset terminals of the counters 13 and 14, so that, whenever the horizontal synchronizing signal a is produced, the counters are reset and start counting the clock pulse signals applied thereto. Thus, the counter 13 counts the length of the dark part (or the region d), while the counter 14 counts the length of the bright part (or the region b). A count value $L_i$ of the counter 13 adapted to count the length of a dark part, and a count value $l_i$ of the counter 14 adapted to count the length of a bright part, after being held by latch circuits 15 and 16 respectively, are applied to the central processing unit 8. Being applied with the horizontal synchronizing signal a and vertical synchronizing signal b from the ITV 6, the central processing unit 8 causes a memory 17 to store the count values $L_i$ and $l_i$ every scanning, and carries out the difference processing of the count values $L_i$ and $l_i$, that is, the following calculations:

$$P_i = (L_{i+2} + L_{i+1}) - (L_{i-1} + L_{i-2})$$

or $$P_i' = L_{i+1} - L_{i-1}$$

and $$Q_i = (l_{i+2} - l_{i+1}) - (l_{i-1} + l_{i-2})$$

or $$Q_i' = l_{i+1} - l_{i-1}$$

From the above processing, values $i_1$ and $i_2$ defining a positive maximum value $P_i$ or $P_i'$ are obtained to determine the two ends of the weld line 3, a value $(i_1+i_2)/2$ is obtained to determine the center of the weld line 3, and a value $(i_2-i_1)$ is obtained to determine the width of the weld line (FIG. 8, (a)).

Similarly, among values $i_3$, $i_4$, $i_5$ and $i_6$ defining a maximum values $Q_i$ or $Q_i'$, a half of the central values $i_4$ and $i_5$, i.e. a value $\frac{1}{2}(i_4+i_5)$ determines the center of the wire 4.

Therefore, if the central processing unit 8 outputs a control signal according to signals representative of the center and width of the weld line 3 and to a signal representative of the center position of the wire 4 so that the welding torch of the automatic welder (not shown) is moved along the weld line at all times, then the automatic welding can be achieved with the welding torch being at a suitable position on the weld line at all times.

In the above-described embodiment of the invention, the dark part $d_i$ on the scanning start side (on the left-hand side of FIG. 5) is utilized. However, it is obvious that the same effect can be obtained by utilizing the dark part $d_i'$ on the right-hand side of FIG. 5.

While the invention has been described with reference to the case where the welding groove is "I"-shaped, however, the invention is not limited thereto or thereby, that is, the method of the invention can be effectively applied to fillet weld, "V" weld, and weld in V-shaped groove.

What is claimed is:

1. Apparatus for detecting a weld line, comprising:
video signal generating means for providing a video signal of a weld;
binary-coding means for binary-coding said video signal into a signal representative of a dark part and a signal representative of a bright part in a weld portion;
counting means for counting the length of at least one of said bright part or dark part in the direction of scan of said video signal according to said binary-coded signals; and
detecting means for subjecting the outputs of said counting means to difference processing, to detect the position of said weld line according to the difference processing.

2. Apparatus as claimed in claim 1, in which said counting means counts both the length of said bright part and the length of said dark part in the direction of the scan of said video signal, and said detecting means carries out difference processing with respect to both said bright part and dark part.

3. Apparatus as claimed in claim 1, in which said video signal generating means is a television camera which is provided in such a manner as to advance ahead of a welding wire advancing along said weld line, and which is adapted to take a picture of said weld from above.

4. Apparatus as claimed in claim 1, in which said binary-coding means is a comparator in which said video signal is compared with a predetermined threshold value.

5. Apparatus as claimed in claim 1, in which said counting means comprises counters for counting clock pulses of a predetermined frequency, wherein said counters are controlled by said binary-coded signals.

6. Apparatus as claimed in claim 5, in which said video signal includes a horizontal synchronizing signal and said counters are reset by the horizontal synchronizing signal.

7. Apparatus as claimed in claim 1, in which said detecting means carries out difference processing indicated by the following equation:

$$M_i = (i\ k_{i+2} + k_{i+1}) - (k_{i-1} + k_{i-2})$$

where $k_i$ is the value corresponding to the length of said dark part or bright part which is counted by said counting means in the i-th scanning, and which detects the position of the center of said weld line from the average of values corresponding to maximum values of said value $M_i$.

8. Apparatus as claimed in claim 2, in which the video signal provides a video signal of both a weld and a welding wire, the scanning direction of said video signal is in the direction of said weld line, and said detecting means carries out difference processing indicated by the following equations:

$$P_i = (L_{i+2} + L_{i+1}) - (L_{i-1} + L_{i-2})$$

$$Q_i = (l_{i+2} + l_{i+1}) - (l_{i-1} + l_{i-2})$$

where $L_i$ and $l_i$ are the lengths of said dark part and bright part, respectively, which are counted by said counting means in the i-th scanning, and said detecting means detects the positions of the centers of said weld line and said welding wire from an average of positional data corresponding to central ones of maximum values of said values $P_i$ and $Q_i$.

9. Apparatus as claimed in claim 2, in which the video signal provides a video signal of both a weld and a welding wire, the scanning direction of said video signal is in the direction of said weld line, and said detecting means carries out difference processing indicated by the following equations:

$$P_i' = L_{i+1} - L_{i-1}$$

$$Q_i' = l_{i+1} - l_{i-1}$$

where $L_i$ and $l_i$ are the lengths of said dark part and bright part, respectively, which are counted by said counting means in the i-th scanning, and said detecting means detects the positions of the centers of said weld line and said welding wire from an average of positional data corresponding to central ones of maximum values of said values $P_i'$ and $Q_i'$.

10. Apparatus for determining the position of a weld line, comprising:
- a video signal generator for performing a line by line video scan of a weld area;
- binary coding means for providing a signal of a first level when the output of the video signal generator is scanning a weld and for providing a signal of a second level when the video signal generator is scanning the area surrounding the weld;
- measurement means for measuring the time during each line scan that the output of the binary coding means is at one of the first or second levels; and
- detecting means for differentially processing the measurement times from sequential line scan measurements to determine the position of the weld line.

11. A method of controlling the position of a weld wire with respect to a weld line, comprising the steps of:
- performing a line by line video scan of an area including a welding arc to thereby generate a video signal having bright portions corresponding to the scanning of the welding arc and dark portions corresponding to the scanning of the weld wire and area surrounding the welding arc;
- determining the length of a predetermined bright portion or dark portion of each line scan and storing said determined length in a memory;
- differentially processing said stored lengths to determine the location of the welding arc and the location of the welding wire; and
- generating a weld wire position control signal in response to said differential processing to thereby move the weld wire to a desired position with respect to the welding arc.

12. The method of claim 11 wherein the step of differentially processing comprises the step of determining a value $M_i$ by adding the lengths stored from one or more sequential scans prior to the i-th scanning and subtracting the sum from the sum of an equal number of sequential scannings after the i-th scanning, wherein the positions of the welding arc and weld wire are indicated by maximum values of $M_i$.

* * * * *